United States Patent
Lu

(10) Patent No.: US 9,488,183 B2
(45) Date of Patent: Nov. 8, 2016

(54) FAN ROTATION SPEED CONTROLLING DEVICE

(71) Applicant: Ryantek Co. Ltd., Taoyuan County (TW)

(72) Inventor: Liang-Chun Lu, Taoyuan County (TW)

(73) Assignee: RYANTEK CO. LTD., Taoyuan County (TW)

( * ) Notice: Subject to any disclaimer, the term of this patent is extended or adjusted under 35 U.S.C. 154(b) by 394 days.

(21) Appl. No.: 14/257,452

(22) Filed: Apr. 21, 2014

(65) Prior Publication Data
US 2015/0044063 A1 Feb. 12, 2015

(30) Foreign Application Priority Data
Aug. 9, 2013 (DE) .................... 20 2013 007 186 U

(51) Int. Cl.
*F04D 27/00* (2006.01)
*H02P 7/29* (2016.01)
*G06F 1/20* (2006.01)

(52) U.S. Cl.
CPC ............. *F04D 27/004* (2013.01); *G06F 1/206* (2013.01); *H02P 7/29* (2013.01)

(58) Field of Classification Search
CPC ........ F04D 27/004; G06F 1/206; H02P 7/29; H02P 7/06; H02P 7/285
See application file for complete search history.

(56) References Cited

U.S. PATENT DOCUMENTS

| | | | | | |
|---|---|---|---|---|---|
| 6,055,359 | A | * | 4/2000 | Gillett ....................... | H02P 7/29 318/432 |
| 2008/0317445 | A1 | * | 12/2008 | Harashima ................ | H02P 7/29 388/811 |

* cited by examiner

*Primary Examiner* — Charles Freay
*Assistant Examiner* — Philip Stimpert
(74) *Attorney, Agent, or Firm* — Muncy, Geissler, Olds & Lowe, P.C.

(57) ABSTRACT

A fan rotation speed controlling device includes a first transistor, a second transistor, a third transistor, a fourth transistor, and at least one heat dissipation fan. The first transistor receives a pulse-width modulation (PWM) signal. The second transistor and the third transistor amplify the PWM signal. The fourth transistor receives the amplified PWM signal and changes its own working state according to the amplified PWM thereby controlling the magnitude of an output voltage. Consequently, the heat dissipation fan changes its rotation speed according to variation of the output voltage. The fan rotation speed controlling device is applicable to and can control the rotation speeds of a plurality of electrically connected fans which are of different specifications.

9 Claims, 2 Drawing Sheets

FAN ROTATION SPEED CONTROLLING DEVICE

BACKGROUND OF THE INVENTION

1. Technical Field

The present invention relates to a fan rotation speed controlling device. More particularly, the present invention relates to a fan rotation speed controlling device applicable to, and capable of controlling the rotation speeds of, a plurality of electrically connected fans which are of different specifications.

2. Description of Related Art

A personal computer system is typically installed with a variety of heat dissipation fans to ensure that all the electronic components work at proper temperatures. However, the wind shear generated by the heat dissipation fans during operation turns out to be the major source of noise in a computer. The higher the rotation speeds of the heat dissipation fans, the more noise is generated by the resulting wind shear. Therefore, with a view to noise reduction, it is important to effectively control the rotation speeds of the fans when the system is idle.

Nowadays, the motherboard of a computer controls a heat dissipation fan mainly in two ways, either by voltage control (VC) or by pulse-width modulation (PWM) control.

VC is the earlier developed of the two control approaches and is applicable to 3-pin fans. More specifically, temperature is detected by a temperature sensor on the motherboard, and voltage is adjusted according to the detection result in order to control the rotation speed of a fan and thereby achieve the intended heat dissipation effect. This approach is advantageous in that a voltage controlled fan (or VC fan for short) is relatively low-cost and that the required circuit is relatively simple. However, noise associated with magnetic shear is generated as the operating voltage of a VC fan is repeatedly switched between high and low levels. Moreover, a VC fan responds relatively slow to rotation speed control.

The more recent PWM control approach, on the other hand, is applicable to 4-pin fans. The additional fourth pin serves to receive from the motherboard a PWM signal for controlling the rotation speed of the fan. This explains why a PWM controlled fan (or PWM fan for short) responds to rotation speed control faster and more accurately than a VC fan. However, a PWM fan has a higher production cost attributable to the built-in PWM signal control IC. Furthermore, a PWM fan cannot be used unless the motherboard supports such fans.

As stated above, both VC and PWM control rely on the support of the motherboard. A PWM fan cannot be applied to a motherboard which only provides voltage control; nor can a VC fan be driven by a PWM signal. Consequently, the existing VC fans and PWM fans are limited in use.

The issue to be addressed by the present invention is to solve the aforementioned problems of the prior art.

BRIEF SUMMARY OF THE INVENTION

In view of the foregoing problems, the inventor of the present invention conducted extensive research, incorporating years of practical experience into repeated trials and improvements, and finally succeeded in developing a fan rotation speed controlling device as disclosed herein.

The primary objective of the present invention is to provide a fan rotation speed controlling device which is applicable to, and can control the rotation speeds of, a plurality of electrically connected fans of different specifications.

To achieve the aforesaid objective, the present invention provides a fan rotation speed controlling device which at least includes a first transistor, a second transistor, a third transistor, a fourth transistor, and at least one heat dissipation fan. The first transistor is configured for receiving a PWM signal and has a first end, a second end, and a third end, wherein the first end is used to receive the PWM signal, and the third end is grounded. The second transistor and the third transistor are configured for amplifying the PWM signal. The second transistor has a first end, a second end, and a third end, wherein the first end is connected to the second end of the first transistor, and the second end is connected to a power source. The third transistor has a first end, a second end, and a third end, wherein the first end is connected to the second end of the first transistor, the second end is grounded, and the third end is connected to the third end of the second transistor. The fourth transistor is configured for receiving the amplified PWM signal such that the working state of the fourth transistor is changed according to the amplified PWM signal to thereby control the magnitude of an output voltage. The fourth transistor has a first end, a second end, and a third end, wherein the first end serves to receive the amplified PWM signal; and the third end is connected to the power source. The heat dissipation fan is connected to the second end of the fourth transistor such that the rotation speed of the heat dissipation fan is changed according to variation of the output voltage.

In a preferred embodiment of the present invention, the first through the third transistors are bipolar junction transistors.

In a preferred embodiment of the present invention, the first end, the second end, and the third end of each of the first through the third transistors are a base, a collector, and an emitter respectively.

In a preferred embodiment of the present invention, the fourth transistor is a field-effect transistor.

In a preferred embodiment of the present invention, the first end, the second end, and the third end of the fourth transistor are a gate, a drain, and a source respectively.

In a preferred embodiment of the present invention, the fan rotation speed controlling device further includes a first resistor, a second resistor, and a first diode. The first resistor has a first end connected to the first end of the first transistor and has an opposite second end connected to the cathode of the first diode. The second resistor has one end connected to the first end of the first transistor and has the opposite end grounded. The anode of the first diode serves to receive the PWM signal.

In a preferred embodiment of the present invention, the fan rotation speed controlling device further includes a third resistor and a fourth resistor. The third resistor has one end connected to the third end of the second transistor and the third end of the third transistor and has the opposite end connected to the first end of the fourth transistor. The fourth resistor has one end connected to the second end of the first transistor, the first end of the second transistor, and the first end of the third transistor. The opposite end of the fourth resistor is connected to the power source.

In a preferred embodiment of the present invention, the fan rotation speed controlling device further includes an inductor, a second diode, a capacitor, and a fuse. The inductor has one end connected to the second end of the fourth transistor and has the opposite end connected to the positive end of the capacitor and one end of the fuse. The second diode has its cathode connected to the second end of the fourth transistor and its anode connected to the negative end of the capacitor. The negative end of the capacitor is grounded. The other end of the fuse is connected to the heat dissipation fan.

In a preferred embodiment of the present invention, the fan rotation speed controlling device further includes a light-emitting diode (LED) and a fifth resistor. The LED has its cathode connected to the heat dissipation fan and its anode connected to one end of the fifth resistor. The other end of the fifth resistor is connected to the power source.

In a preferred embodiment of the present invention, the fourth transistor is integrated in an integrated circuit, and the integrated circuit further includes a third diode, a fourth diode, and a fifth diode. The third diode has its cathode connected to the cathode of the fourth diode and its anode connected to the first end of the fourth transistor. The anode of the fourth diode is connected to the third end of the fourth transistor. The fifth diode has its anode connected to the second end of the fourth transistor and its cathode connected to the third end of the fourth transistor.

According to the present invention, the first transistor receives the PWM signal, the second and the third transistors amplify the PWM signal, and the fourth transistor changes its working state according to the amplified PWM signal and thereby controls the magnitude of the output voltage. Consequently, the heat dissipation fan changes its rotation speed according to variation of the output voltage.

Thus, the present invention not only is applicable to a plurality of electrically connected fans which are of different specifications, but also can control the rotation speeds of the fans.

BRIEF DESCRIPTION OF THE SEVERAL VIEWS OF THE DRAWINGS

The technical means and structures employed in the present invention to achieve the foregoing objective and effects can be best understood by referring to the following detailed description of the features and effects of a preferred embodiment in conjunction with the accompanying drawings, in which.

DETAILED DESCRIPTION OF THE INVENTION

Figure 1:
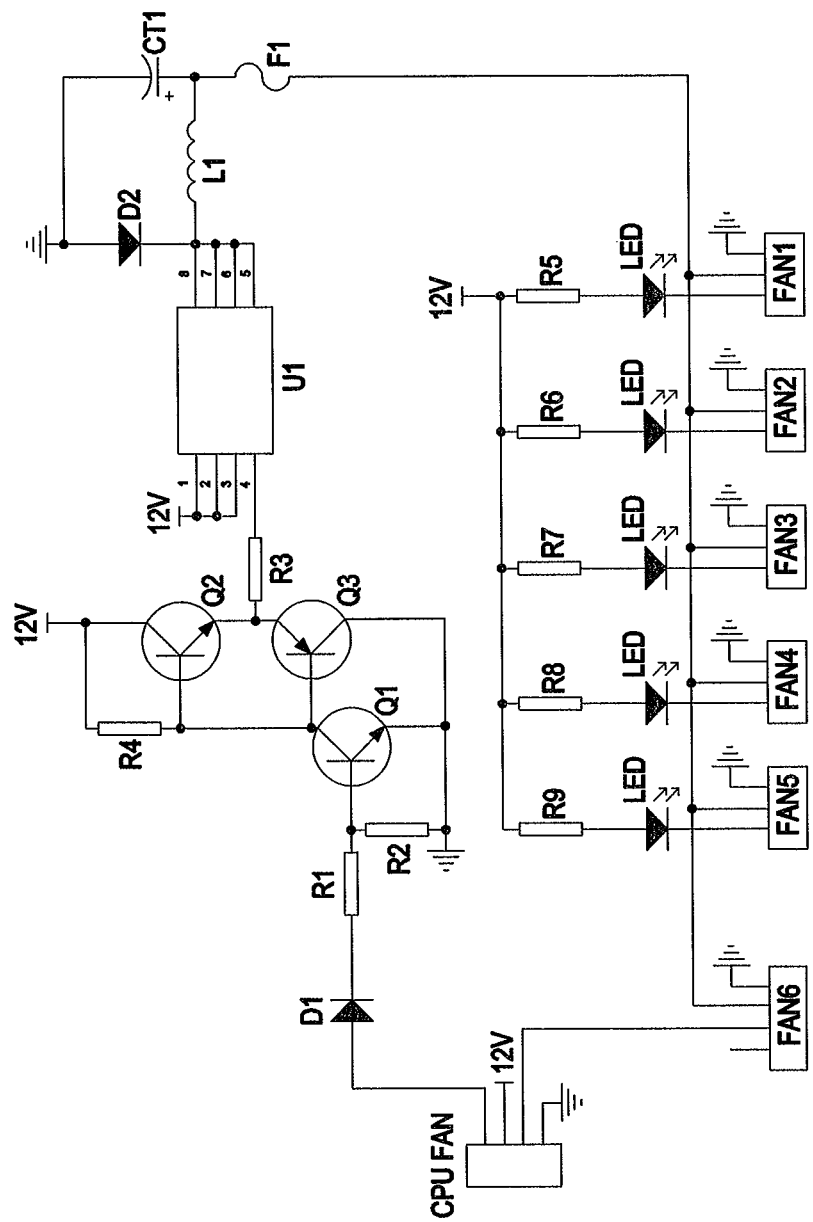
FIG. 1 is the circuit diagram of a preferred embodiment of the present invention.
Figure 2:
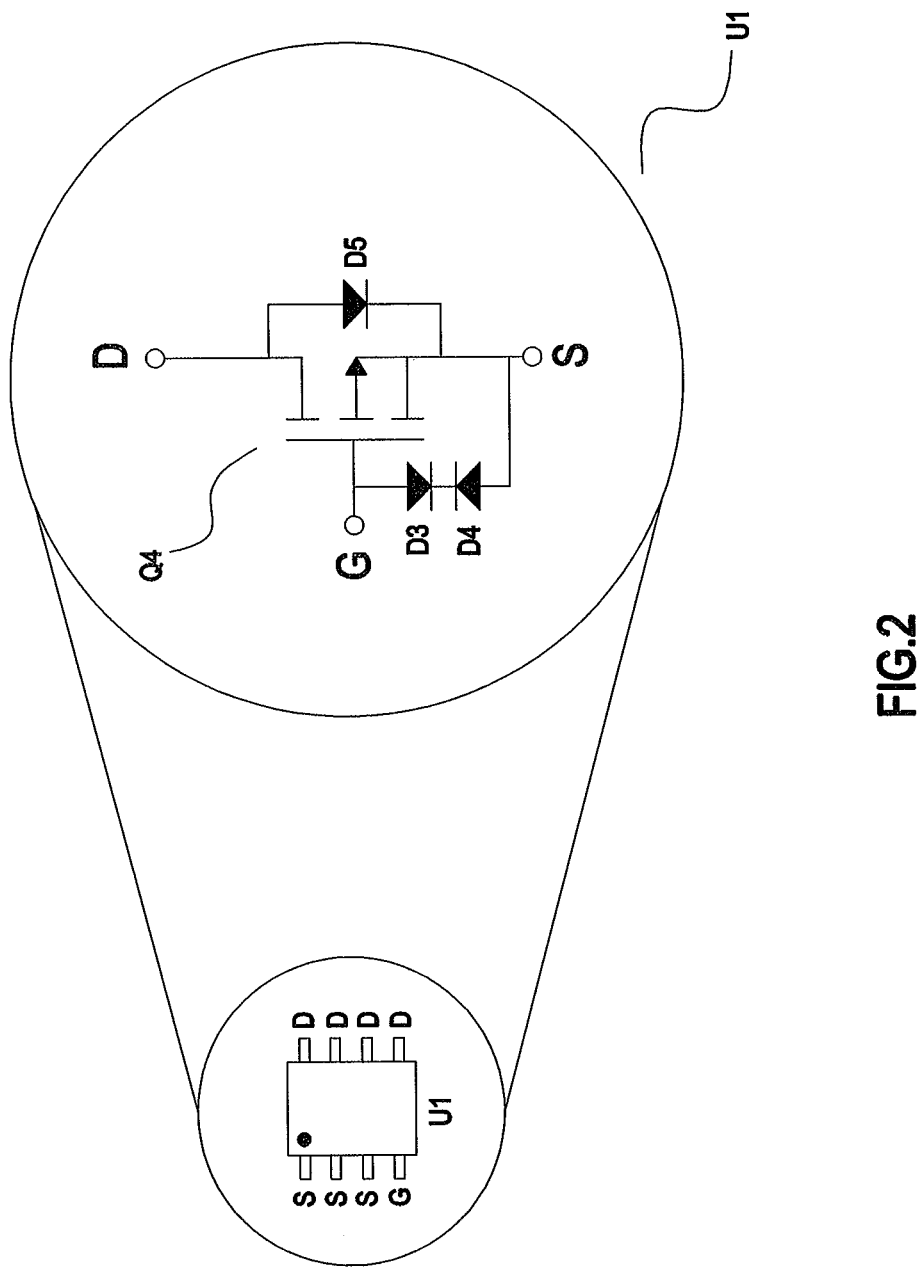
FIG. 2 schematically shows an integrated circuit in the preferred embodiment of the present invention.

Please refer to FIG. 1 and FIG. 2 respectively for the circuit diagram and a partial schematic drawing of a preferred embodiment of the present invention. As shown in the drawings, a fan rotation speed controlling device of the present invention includes, a first transistor Q1, a second transistor Q2, a third transistor Q3, a fourth transistor Q4, and at least one heat dissipation fan FAN1~FAN5.

The first transistor Q1 is configured for receiving a PWM signal and has a first end, a second end, and a third end, wherein the first end receives the PWM signal, and the third end is grounded. In this embodiment, the present invention further includes a first resistor R1, a second resistor R2, and a first diode D1 as are needed in the circuit. The first resistor R1 has a first end connected to the first end of the first transistor Q1 and has an opposite second end connected to the cathode of the first diode D1. The second resistor R2 has one end connected to the first end of the first resistor R1 and has the other end grounded. The anode of the first diode D1 receives the PWM signal.

The second transistor Q2 and the third transistor Q3 serve to amplify the PWM signal. The second transistor Q2 has a first end, a second end, and a third end, wherein the first end is connected to the second end of the first transistor Q1, and the second end is connected to a power source (a 12V power source as in this embodiment). The third transistor Q3 has a first end, a second end, and a third end, wherein the first end is connected to the second end of the first transistor Q1, the second end is grounded, and the third end is connected to the third end of the second transistor Q2. Preferably, the first transistor Q1, the second transistor Q2, and the third transistor Q3 are bipolar junction transistors, and the first end, the second end, and the third end of each of the first through the third transistors Q1~Q3 are a base, a collector, and an emitter respectively.

The fourth transistor Q4 receives the amplified PWM signal, and the working state of the fourth transistor Q4 is changed according to the amplified PWM signal to thereby control the magnitude of an output voltage. The fourth transistor Q4 has a first end, a second end, and a third end, wherein the first end receives the amplified PWM signal, and the third end is connected to the power source. Preferably, the fourth transistor Q4 is a field-effect transistor, with the first end, the second end, and the third end of the fourth transistor Q4 being a gate, a drain, and a source respectively. In this embodiment, the fourth transistor Q4 is integrated in an integrated circuit (IC) U1, and the IC U1 further includes a third diode D3, a fourth diode D4, and a fifth diode D5. The third diode D3 has its cathode connected to the cathode of the fourth diode D4 and its anode connected to the first end of the fourth transistor Q4. The anode of the fourth diode D4 is connected to the third end of the fourth transistor Q4. The fifth diode D5 has its anode connected to the second end of the fourth transistor Q4 and its cathode connected to the third end of the fourth transistor Q4.

In this embodiment, the present invention further includes a third resistor R3 and a fourth resistor R4 as are needed in the circuit. The third resistor R3 has one end connected to the third end of the second transistor Q2 and the third end of the third transistor Q3. The other end of the third resistor R3 is connected to the first end of the fourth transistor Q4. The fourth resistor R4 has one end connected to the second end of the first transistor Q1, the first end of the second transistor Q2, and the first end of the third transistor Q3. The other end of the fourth resistor R4 is connected to the power source.

The heat dissipation fans FAN1~FAN5 are connected to the second end of the fourth transistor Q4, and the rotation speeds of the heat dissipation fans FA1~FAN5 are changed according to variation of the output voltage. As shown in FIG. 1, the present embodiment includes a plurality of heat dissipation fans FAN1~FAN5 electrically connected together. Preferably, the present invention further includes an LED and a fifth resistor R5 for the heat dissipation fan FAN1. The LED has its cathode connected to the heat dissipation fan FAN1 and its anode connected to one end of the fifth resistor R5. The other end of the fifth resistor R5 is connected to the power source. Thus, the LED serves as a power indicator for the heat dissipation fan FAN1 while the fifth resistor R5 provides current limitation. Similarly, as shown in FIG. 1, the heat dissipation fans FAN2~FAN5 are each provided with an LED and a resistor R6~R9, whose connections are the same as those associated with the heat dissipation fan FAN1.

In the present embodiment, the present invention further includes an inductor L1, a second diode D2, a capacitor CT1, and a fuse F1. The inductor L1 has one end connected to the second end of the fourth transistor Q4 and has the other end connected to the positive end of the capacitor CT1 and a first end of the fuse F1. The second diode D2 has its cathode connected to the second end of the fourth transistor Q4 and its anode connected to the negative end of the capacitor CT1, wherein the negative end of the capacitor CT1 is grounded. The fuse F1 has a second end connected to the heat dissipation fans FAN1~FAN5. The capacitor CT1 and the inductor L1 form a filter circuit for filtering out noise generated by the power source, thus serving the purpose of stabilization. Meanwhile, the second diode D2 provides reverse polarity protection. The fuse F1 is a resettable fuse.

In the present embodiment, the second end of the fuse F1 is further connected with a fan FAN6, and the fan FAN6 is connected to a central processing unit fan CPU FAN, where the PWM signal originates.

The fan rotation speed controlling device described above works in the following manner. The PWM signal is received by the first transistor Q1 and then amplified by the second transistor Q2 and the third transistor Q3. Based on the amplified PWM signal, the fourth transistor Q4 changes its working state and thereby controls the magnitude of the output voltage. As a result, the rotation speeds of the heat dissipation fans FAN1~FAN5 are changed in accordance with variation of the output voltage.

The working state of the fourth transistor Q4 can be switched between an on state, a half-on state, and a cutoff state in order to reduce the 12V voltage provided by the power source, wherein the reduction may range from 0 to 100%. The resulting output voltage is then supplied to the heat dissipation fans FAN1~FAN5. Thus, the rotation speeds of the heat dissipation fans FAN1~FAN5 are controlled through voltage regulation, which in turn is controlled by the PWM signal. This allows a variety of (namely 2-pin, 3-pin, and 4-pin) 12V DC heat dissipation fans FAN1~FAN5 to be used in the same circuit: In other words, the PWM control approach of the present invention is applicable not only to a plurality of 4-pin PWM fans, but also to a combination of 4-pin PWM fans and non-PWM (2-pin/3-pin) fans, which is unachievable in the prior art. In short, the present invention supports a combined use of fans of different specifications (e.g., both VC fans and PWM fans).

In use, due to the inherent voltage drop in the fourth transistor Q4 (a field-effect transistor) attributable to the two germanium channels inside (0.3+0.3=0.6V), the maximum output voltage is only 11.4V. Therefore, the highest rotation speeds of the heat dissipation fans FAN1~FAN5 are slightly lower than designed and correspond approximately to 11.4V.

According to the above description and the accompanying drawings, the present invention is advantageous over the prior art in that it is applicable to and can control the rotation speeds of a plurality of electrically connected fans which are of different specifications.

The foregoing embodiment is only a preferred embodiment of the present invention and is not restrictive of the scope of the present invention. All simple modifications and equivalent structural variations based on the disclosure of the present specification and the accompanying drawings should fall within the scope of the present invention.

What is claimed is:

1. A fan rotation speed controlling device, comprising:
a first transistor for receiving a pulse-width modulation (PWM) signal, the first transistor having a first end, a second end, and a third end, wherein the first end of the first transistor receives the PWM signal, and the third end of the first transistor is grounded;
a second transistor and a third transistor for amplifying the PWM signal, the second transistor having a first end, a second end, and a third end, wherein the first end of the second transistor is directly electrically connected to the second end of the first transistor, and the second end of the second transistor is directly electrically connected to a power source, the third transistor having a first end, a second end, and a third end, wherein the first end of the third transistor is directly electrically connected to the second end of the first transistor, the second end of the third transistor is grounded, and the third end of the third transistor is directly electrically connected to the third end of the second transistor;
a fourth transistor for receiving the amplified PWM signal such that a working state of the fourth transistor is changed according to the amplified PWM signal to thereby control a magnitude of an output voltage, the fourth transistor having a first end, a second end, and a third end, wherein the first end of the fourth transistor receives the amplified PWM signal, and the third end of the fourth transistor is directly electrically connected to the power source; a first resistor, a second resistor, and a first diode, wherein the first resistor has a first end directly electrically connected to the first end of the first transistor and a second end directly electrically connected to a cathode of the first diode, the second resistor has an end directly electrically connected to the first end of the first resistor and has an opposite end grounded, and the first diode has an anode for receiving the PWM signal; and
at least one heat dissipation fan connected to the second end of the fourth transistor such that a rotation speed of the heat dissipation fan is changed according to variation of the output voltage.

2. The fan rotation speed controlling device of claim 1, wherein the first transistor, the second transistor, and the third transistor are bipolar junction transistors.

3. The fan rotation speed controlling device of claim 2, wherein the first end, the second end, and the third end of each of the first transistor, the second transistor, and the third transistor are a base, a collector, and an emitter respectively.

4. The fan rotation speed controlling device of claim 1, wherein the fourth transistor is a field-effect transistor.

5. The fan rotation speed controlling device of claim 4, wherein the first end, the second end, and the third end of the fourth transistor are a gate, a drain, and a source respectively.

6. The fan rotation speed controlling device of claim 1, further comprising a third resistor and a fourth resistor, wherein the third resistor has an end connected to the third end of the second transistor and the third end of the third transistor and has an opposite end connected to the first end of the fourth transistor, the fourth resistor has an end connected to the second end of the first transistor, the first end of the second transistor, and the first end of the third transistor, and the fourth resistor has an opposite end connected to the power source.

7. The fan rotation speed controlling device of claim 1, further comprising an inductor, a second diode, a capacitor, and a fuse, wherein the inductor has an end connected to the second end of the fourth transistor and has an opposite end connected to a positive end of the capacitor and an end of the fuse, the second diode has a cathode connected to the second end of the fourth transistor and has an anode connected to a negative end of the capacitor, the negative end of the capacitor is grounded, and the fuse has an opposite end connected to the heat dissipation fan.

8. The fan rotation speed controlling device of claim 1, further comprising a light-emitting diode (LED) and a fifth resistor, wherein the LED has a cathode connected to the heat dissipation fan and has an anode connected to an end of the fifth resistor, and the fifth resistor has an opposite end connected to the power source.

9. The fan rotation speed controlling device of claim 1, wherein the fourth transistor is integrated in an integrated circuit, and the integrated circuit further includes a third diode, a fourth diode, and a fifth diode, wherein the third diode has a cathode connected to a cathode of the fourth diode and has an anode connected to the first end of the fourth transistor, the fourth diode has an anode connected to the third end of the fourth transistor, and the fifth diode has an anode connected to the second end of the fourth transistor and has a cathode connected to the third end of the fourth transistor.

* * * * *